United States Patent
Mossner et al.

(10) Patent No.: US 9,344,558 B2
(45) Date of Patent: May 17, 2016

(54) COMMUNICATIONS SYSTEM FOR ANONYMOUS CALLS

(71) Applicant: GN Store Nord A/S, Ballerup (DK)

(72) Inventors: Peter Mossner, Kastrup (DK); Peter Schou Sorensen, Valby (DK)

(73) Assignee: GN Store Nord A/S (DK)

( * ) Notice: Subject to any disclaimer, the term of this patent is extended or adjusted under 35 U.S.C. 154(b) by 0 days.

(21) Appl. No.: 14/571,776

(22) Filed: Dec. 16, 2014

(65) Prior Publication Data

US 2015/0181027 A1    Jun. 25, 2015

(30) Foreign Application Priority Data

Dec. 20, 2013    (EP) ..................................... 13198877

(51) Int. Cl.
*H04M 1/56*  (2006.01)
*H04M 15/06*  (2006.01)
*H04M 3/42*  (2006.01)
*H04L 29/06*  (2006.01)
*H04S 7/00*  (2006.01)
*H04W 64/00*  (2009.01)

(52) U.S. Cl.
CPC ....... *H04M 3/42042* (2013.01); *H04L 63/0421* (2013.01); *H04M 3/42008* (2013.01); *H04M 3/42093* (2013.01); *H04M 3/42348* (2013.01); *H04S 7/302* (2013.01); *H04W 64/006* (2013.01); *H04S 7/303* (2013.01)

(58) Field of Classification Search
CPC .... H04M 11/025; H04L 45/04; H04W 4/002; H04W 4/06; H04W 79/022; H04R 3/005; H04R 3/12; G10L 25/27
USPC ............ 379/142.01, 142.02, 142.04, 142.06, 379/142.1, 142.17, 201.11, 207.12; 455/404.02, 415, 414.1, 425
See application file for complete search history.

(56) References Cited

U.S. PATENT DOCUMENTS

| | | | | |
|---|---|---|---|---|
| 5,815,808 | A * | 9/1998 | Valentine | H04M 3/38 379/196 |
| 7,315,734 | B2 * | 1/2008 | Friedenfelds | H04Q 3/64 379/45 |
| 8,238,890 | B2 * | 8/2012 | Yamakita | H04M 3/46 379/88.19 |
| 9,131,068 | B2 * | 9/2015 | Cheatham, III | H04M 11/025 |
| 2004/0114772 | A1 * | 6/2004 | Zlotnick | H04R 3/12 381/92 |
| 2007/0280465 | A1 | 12/2007 | Greve | |

(Continued)

OTHER PUBLICATIONS

Extended European Search Report dated Jun. 3, 2014 for European patent application No. 13198877.6.

*Primary Examiner* — Binh Tieu
(74) *Attorney, Agent, or Firm* — Altera Law Group, LLC

(57) ABSTRACT

This invention relates to an audio caller communication system, an audio callee communication system, a shares connection server and method of initiating a call signal between or connecting an audio caller communications system with an audio callee communications system through a communications channel via a shared connection server, the method comprising initiating a call signal or connecting the at least one audio callee communication system with at least one audio caller communication system through the communications channel via the shared connection server as a function of at least one callee position of the audio callee communication system and; and at least one caller position and/or at least one caller orientation of the audio caller communication system. The caller system, the callee system and the shared connection system are configured to perform such method.

19 Claims, 10 Drawing Sheets

(56) References Cited

U.S. PATENT DOCUMENTS

| | | |
|---|---|---|
| 2008/0260169 A1 | 10/2008 | Reuss |
| 2010/0085896 A1* | 4/2010 | Hattori .................... H04L 45/04 370/254 |
| 2010/0144345 A1* | 6/2010 | Darrow ................... H04W 4/16 455/434 |
| 2011/0201305 A1 | 8/2011 | Buer |
| 2014/0219431 A1* | 8/2014 | Wagner ............... H04M 11/025 379/167.02 |

* cited by examiner

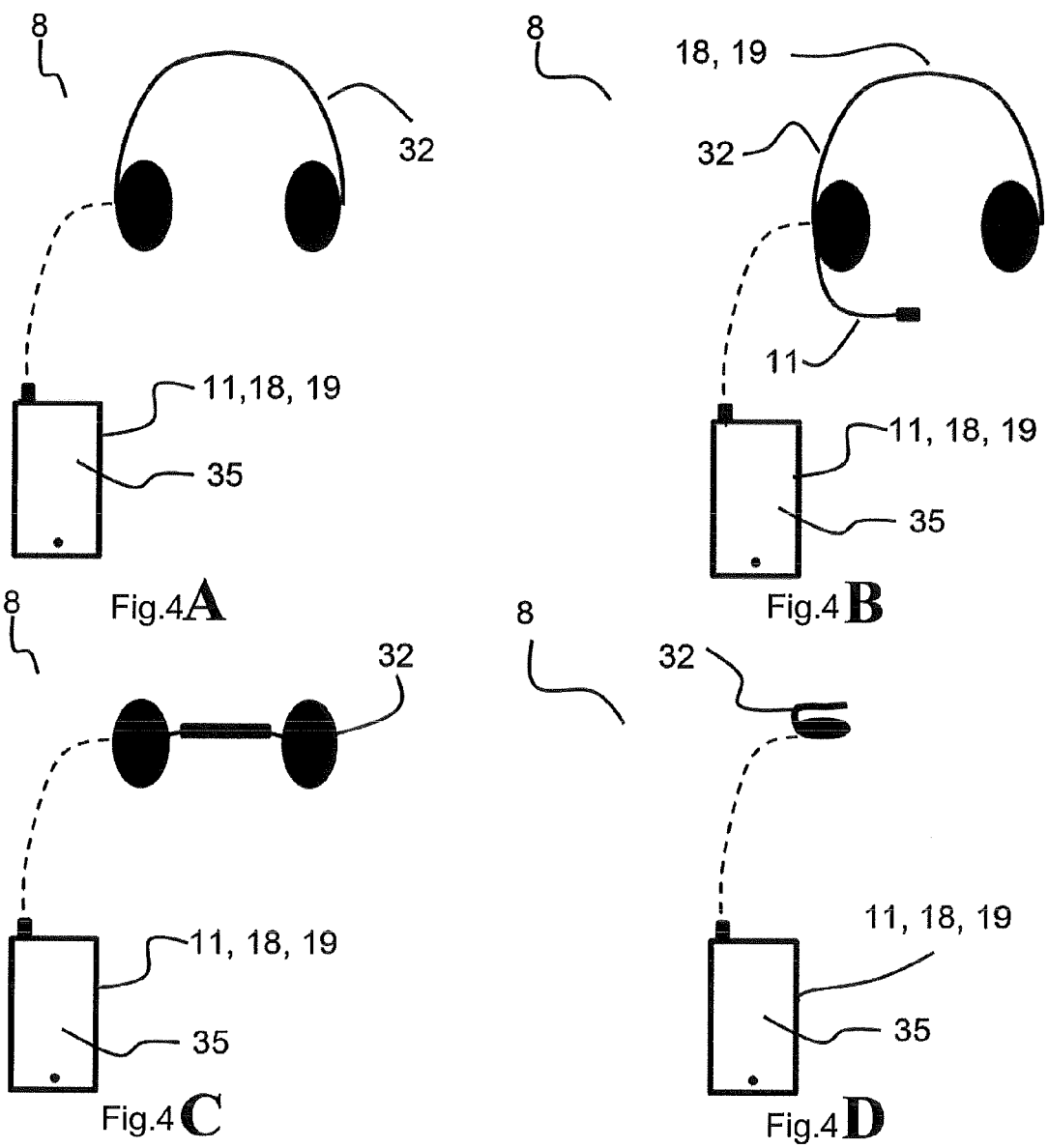

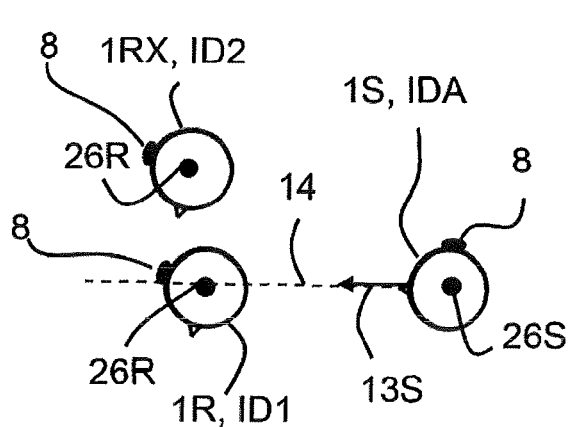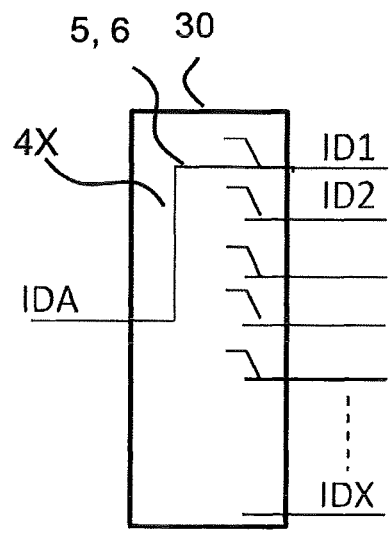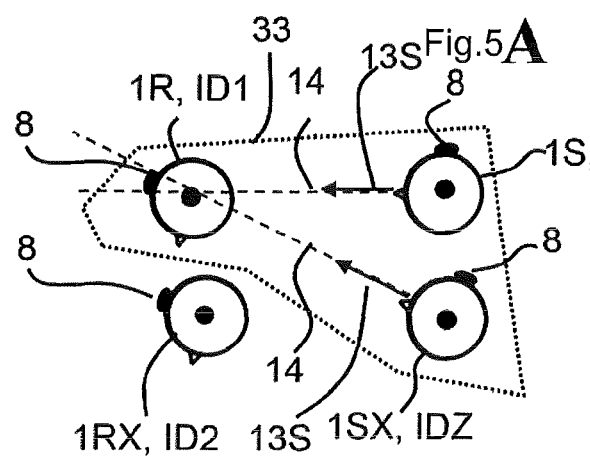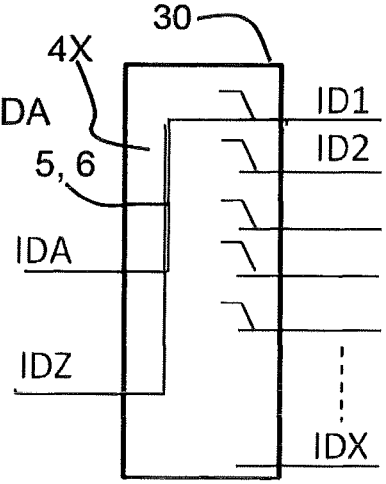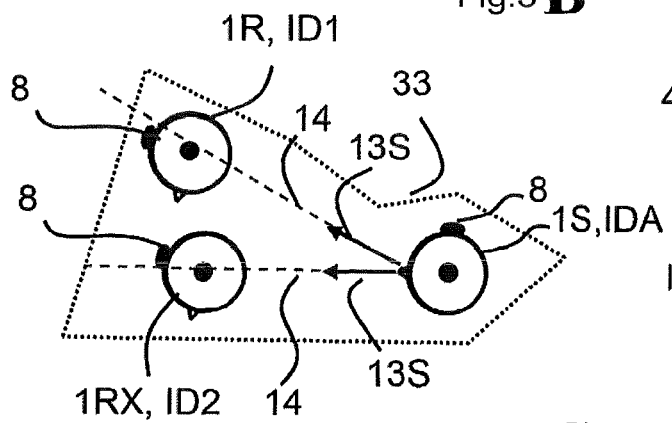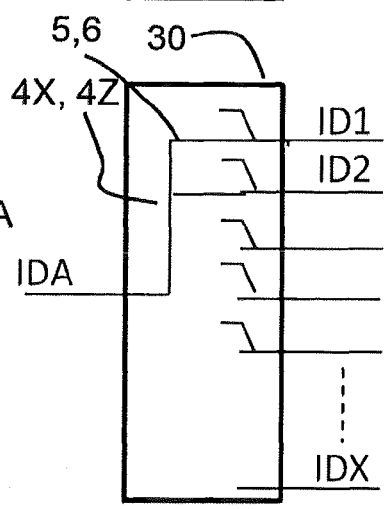

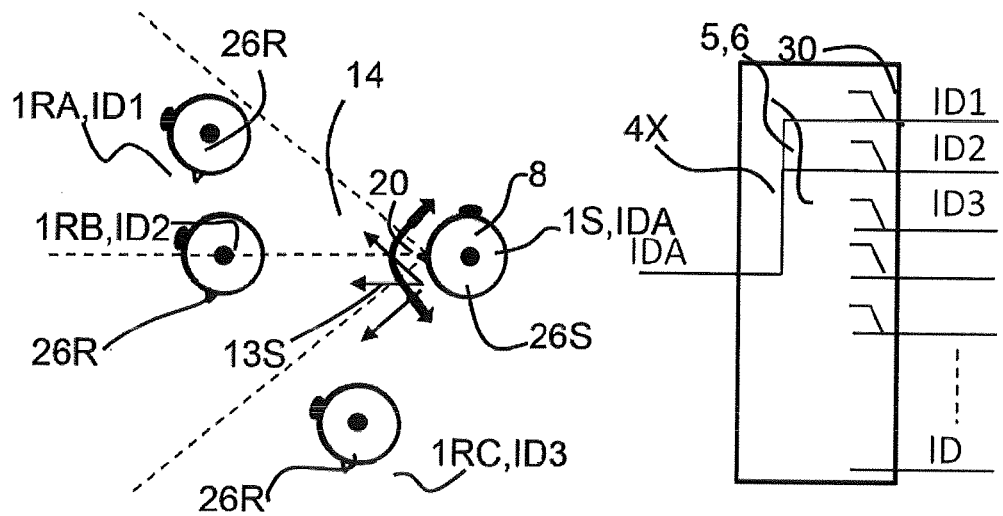
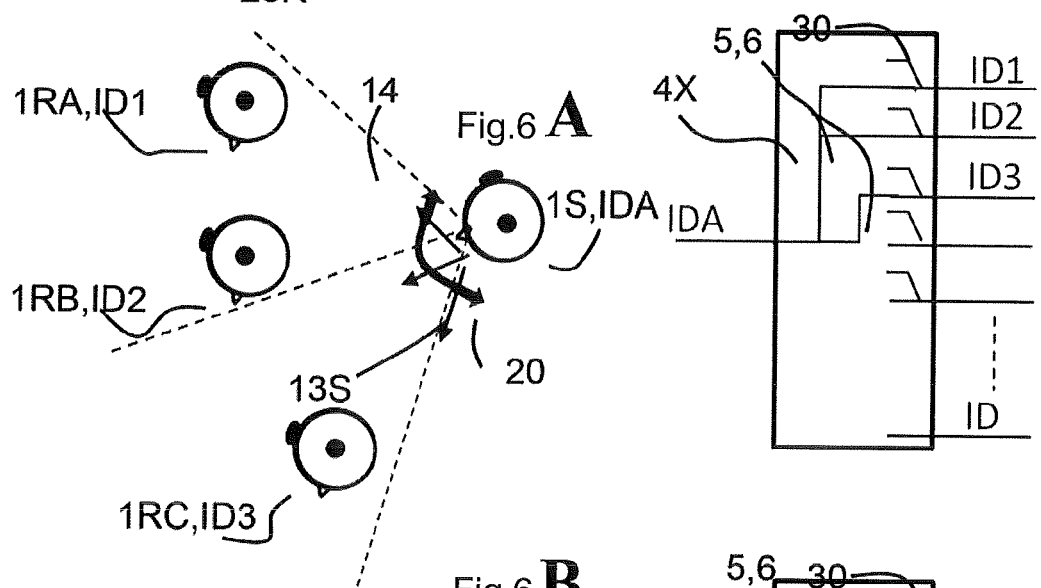
Fig.6 A
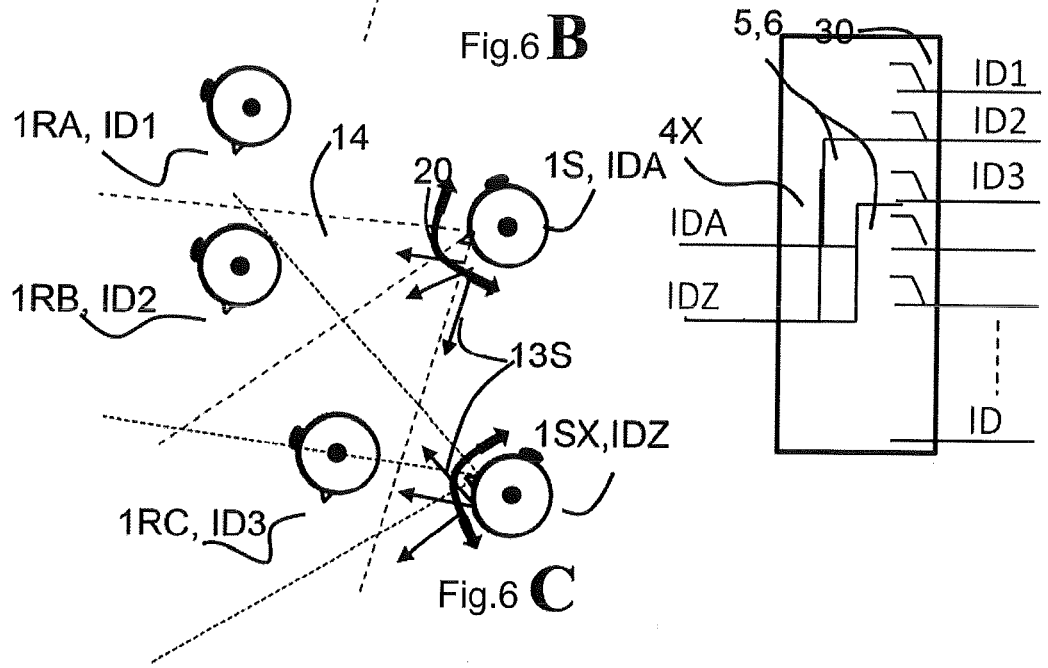
Fig.6 B
Fig.6 C

COMMUNICATIONS SYSTEM FOR ANONYMOUS CALLS

FIELD OF INVENTION

This invention relates to an audio caller communication system, an audio callee communication system, a shares connection server and method of initiating a call signal between or connecting an audio caller communications system with an audio callee communications system through a communications channel via a shared connection server, the method comprising initiating a call signal or connecting the at least one audio callee communication system with at least one audio caller communication system through the communications channel via the shared connection server as a function of at least one callee position of the audio callee communication system and; and at least one caller position and/or at least one caller orientation of the audio caller communication system. The caller system, the callee system and the shared connection system are configured to perform such method.

BACKGROUND OF THE INVENTION

Audio communications systems such as mobile phones have become rich on geographical features, but are limited to be available for communication via a call ID such as a telephone number provided by the operator of a public network or any other personalised ID.

An objective of this invention is to overcome such limitation.

In particular an object of this invention is to make a call ID available for a call from or a connection between parties, who do not know the call ID, but who may have other information such as, but not limited to, as the location of the device with the call ID.

Another object of this invention is to provide a system as a callee and a way of connecting to an audio communication system being part of a public network and who has made at least a position available to allow for a call or a connection from a caller. In particular to make the call or connection possible based on the location or orientation of the caller.

SUMMARY

An objective is achieved by an audio caller communication system configured to communicate via a public communications network where each audio caller communications system has at least one call ID for identification and for a connected call with at least one audio callee communication system through a communications channel that can be open or closed. The audio caller communication system comprising at least one audio unit configured to sound a voice sound to a user using the audio caller communication system and from the at least one audio callee communication system. Furthermore, the audio caller communication system comprising at least one microphone configured to receive the voice sound from the user using the audio caller communication system. Additionally, the audio caller communication system comprising a position unit configured to estimate a current caller position of the audio caller communication system. Furthermore, the audio caller communication system comprising an orientation unit configured for estimating a current caller orientation of the audio caller communication system and a caller field of view in the caller orientation of the audio caller communication system. Additionally, the audio caller communication system is configured to communicate with a shared connection server about the current caller position, the caller orientation and the call ID of the audio caller communication system, and to make the at least one call ID available as a caller ID via the shared connection server for a call signal to the at least one audio callee communication system for a connection through the communications channel as a function of at least the current caller position and/or at least the current caller orientation.

Thus, the audio caller communication system overcomes the limitation of the prior art by a user handling the audio caller communication system, and wherein the audio caller communication system may be configured to communicate with a shared connection server about the current caller position, the caller orientation and the call ID of the audio caller communication system, and to make the at least one call ID available as a caller ID via the shared connection server for a call signal to the at least one audio callee communication system for a connection through the communications channel as a function of at least the current caller position and/or at least the current caller orientation.

An effect thereof is to provide the user of the audio caller communication system the ability of communicating with at least one other user configured to an audio callee communication system at any time and in any situation according to the caller position and/or caller orientation.

A further effect thereof is to provide the user of the audio caller communication system the skills to selectively communicate with one or more user of audio callee communication systems according to a physical movement or the field of view based on the current caller position and caller orientation.

Furthermore, an objective of the invention is achieved by an audio callee communication system configured to communicate via a public communications network where the audio callee communications system has at least one call ID for identification and for a connected call with at least one audio caller communication system through a communications channel that can be open or closed. The audio callee communication system comprising at least one audio unit configured to sound a voice sound to a user using the audio callee communication system and from the at least one audio caller communication system. Furthermore, the audio callee communication system comprising at least one microphone configured to receive the voice sound from the user using the audio callee communication system. Additionally, the audio callee communication system comprising a position unit configured to estimate a current callee position of the audio callee communication system. Furthermore, the audio callee communication system is configured to communicate with a shared connection server about the current position and the call ID of the audio callee communication system, and to make the at least one call ID available as a callee ID via the shared connection server for a call signal from the at least one audio caller communication system for a connection through the communications channel as a function of at least the current callee position.

Thus, the audio callee communication system overcomes the limitation of the prior art by a user handling the audio callee communication system, and wherein the audio callee communication system may be configured to communicate with a shared connection server about the current position and the call ID of the audio callee communication system, and to make the at least one call ID available as a callee ID via the shared connection server for a call signal from the at least one audio caller communication system for a connection through the communications channel as a function of at least the current callee position.

An effect thereof is that the user of the audio callee communication system has the ability of receiving a call from at least one other user configured to an audio caller communication system at any time and in any situation according to the callee position.

Additionally, an objective of the invention is achieved by a shared connection server configured to communicate with at least an audio caller communications system about at least one call ID as a caller ID and at least the current caller position and/or the caller orientation, and with at least an audio callee communications system about at least one call ID as a callee ID and at least the current callee position. The shared connection server is configured to connect at least one audio callee communication system with at least one audio caller communication system through a communications channel as a function of at least one callee position and at least one caller position and/or at least one caller orientation.

Thus, the shared connection server overcomes the limitation of the prior art by a user handling the audio callee communication system and another user handling the audio caller communication system, and wherein the shared connection server may be configured to connect at least one audio callee communication system with at least one audio caller communication system through a communications channel as a function of at least one callee position and at least one caller position and/or at least one caller orientation.

An effect thereof is to provide the user of the audio caller communication system and another user of the audio callee communication system the ability of communication to each other at any time and in any situation according to the callee position and the caller position and/or caller orientation.

Additionally, an objective is achieved by a method of initiating a call signal between or connecting an audio caller communications system with an audio callee communications system through a communications channel via a shared connection server. The method comprising initiating a call signal or connecting the at least one audio callee communication system with at least one audio caller communication system through the communications channel via the shared connection server as a function of at least one callee position of the audio callee communication system, and at least one caller position and/or at least one caller orientation of the audio caller communication system.

An audio caller communications system and/or an audio callee communication system may be phone such as a Smartphone and configured to identify by a call ID may be a telephone number of a phone in a public network as known to the person skilled in the art. In such a configuration, knowledge of a callee's call ID must be known by the caller to initiate a call and/or a connection.

In another embodiment the audio communication system is a computer with a software programme, where the caller and callee are identified by a chat-name, a Skype-name, or any other ID identifying the users presence and availability for contact.

In one or more embodiments the audio caller communication system may be configured to make the call ID publically available via the shared connection server for a call signal to the at least one audio callee communication system without disclosing the call ID of the audio caller communication system to the at least one audio callee communication system.

An effect thereof is to provide the user of the audio caller communication system the ability of making contact to and to communicating with another user of the audio callee communication system anonymously. As such the callee can become available for a contact without having to disclose the callee ID.

A further effect thereof is to provide the user of the audio caller communication system the ability of communicating with another user of the audio callee communication system promptly without knowing the ID of the callee. The advantage of the audio caller communication system may be that the caller has the possibility of getting into contact with any callee being detected by the audio caller communication system. Thereby, the callee may be distantly placed in relation to the caller.

In one or more embodiments of the audio caller communication system, the current caller position and/or the current caller orientation are linked to the call ID of the audio caller communication system and which caller position and/or caller orientation are made publically available via the shared connection server for a call signal to the at least one audio callee communication system.

An effect thereof is the ability of the caller to track his calls to one or more callees.

A further effect thereof is that any other caller or callee may be able to track the physical position and/or movement of the caller.

In one or more embodiments the audio caller communications system may be further configured for establishing a communication group of one or more audio callee communications system via the shared connection server.

An effect thereof is to provide the audio caller communication system the ability of communicating simultaneously with one or more audio callee communication system in the communication group. Additionally, the caller may communicate separately with each audio callee communication system in the communication group.

The simultaneously communication may be a discussion or a conversation between a caller and plurality of callees where it may be possible for the caller or the callee to interrupt each other verbally. The caller has the possibility of excluding a callee from the communication group.

In one or more embodiments the audio caller communications system may be further configured for transferring data (31) via data communication channel (5X) when a connection is made with an audio callee communications system (1R).

An effect thereof is to provide the audio caller communication system the ability to transfer/communicate non-oral information. The advantage of this is that the user of the audio caller communication system has the possibility of sharing at least a picture file, a document file, and a text message file with a callee.

In one or more embodiments the audio callee communication system may be configured to make the call ID publically available via the shared connection server for a call signal by at least one audio caller communication system without disclosing the call ID of the audio callee communication system to the at least one audio caller communication system.

An effect thereof is to provide the user of the audio callee communication system the ability of accepting a call from one or more callers anonymously.

A further effect thereof is to provide the user of the audio callee communication the possibility of being available for any call from one or more callers. Thereby, when the audio callee communication system may be active, the callee may be available at any time to assist or help a caller which may be distantly placed in relation to the callee.

In one or more embodiments of the audio callee communication system the current callee position may be linked to the call ID of the audio callee communication system, which callee position may be made publically available via the shared connection server for a call signal from at least one audio caller communication system.

An effect thereof is the ability of the callee to track his calls to one or more callers.

A further effect thereof is that any other caller or callee may be able to track the physical position of the callee.

A further effect thereof is that the caller may be able select the callee according to the position of the callee.

In one or more embodiments the audio callee communication system may be configured as an audio caller communication system.

In one or more embodiments the audio caller communication system may be configured as an audio callee communication system.

Thus a caller and a callee system may be the same system.

An effect thereof is that the user may be able to switch between the audio callee communication system and the audio caller communication system.

In one or more embodiments of the shared connection server, the caller ID of the at least one audio caller communication system and the callee ID of the at least one audio callee communication system may be made publically available via the shared connection server for connecting at least one audio caller communication system with at least one callee communication system without disclosing the callee ID to the at least one audio caller communication system and/or the caller ID to the at least one audio callee communication system.

An effect thereof is that the shared connection server may be able to handle communication between one or more callers and one or more callees without disclosing one or more callee IDs and one or more caller IDs.

In one or more embodiments of the shared connection server, the at least one caller position and the at least one caller orientation of the audio caller communication system and/or the at least one callee position of the audio callee communication system are made publically available via the shared connection server for connecting at least one audio caller communication system with at least one callee communication system.

An effect thereof is that the shared connection server may be able to establish a communication between one or more callers and one or more callees based on caller and callee position and/or caller orientation. The advantage of the shared connection server may be that the caller ID and callee ID may not be disclosed during establishment of the communication between one or more callers and one or more callees.

In one or more embodiments the method of initiating a call signal between or connecting an audio caller communications system with an audio callee communications system, the method comprising activating a call signal or establishing a connection via the shared connection server to the at least audio callee communication system when the current callee position of the audio callee communication system is within a caller field of view of the audio caller communication system.

An effect thereof is that the caller may call via the shared connection server to one or more callee distantly placed and without knowing the call ID of the callee. The advantage of this is that the caller may want to get in contact with one or more callee quietly and without involving people surrounding the caller.

A further effect thereof is that the caller may look towards a group of people, and without changing the caller orientation the audio caller communication system may activate a call to at least one or more callee within the group of people. Thereby, the field of view may improve the possibility of the caller to find and activate a call to at least one callee.

Thereby, the caller may converse with the callee without revealing the content of the conversation to other people/user. A further advantage may be that the caller has the possibility to get in contact with a callee which seems interesting. Alternatively, the callee may be distantly placed.

In one or more embodiments the method of initiating a call signal or connecting an audio caller communications system with an audio callee communications system, the method comprising activating a call signal or establishing a connection via the shared connection server to the at least audio callee communication system when the audio caller communication system is approaching the audio callee communications system.

An effect thereof is that the shared communication server may be able establish a communication between a caller and a callee according to the movement of the caller.

In one or more embodiments the method of initiating a call signal or connecting an audio caller communications system with an audio callee communications system, the method comprising activating a call signal or establishing a connection via the shared connection server to the at least audio callee communication system when the current callee position of the at least one audio callee communication system is a first encounter along a line of sight in the direction of the caller orientation.

An effect thereof is that the caller may activate a call to a specific callee to a callee which has caught the interest of the caller.

In one or more embodiments the method of initiating a call signal or connecting an audio caller communications system with an audio callee communications system, the method may comprise activating a call signal or establishing a connection via the shared connection server to the at least audio callee communication system when the current callee position of the at least one audio callee communication system is within an area of view at a certain distance in the direction of the caller orientation.

An effect thereof is that the caller may call via the shared connection server to one or more callee distantly placed and without knowing the call ID of the callee. The advantage of this is that the caller may want to get in contact with one or more callee quietly and without involving people surrounding the caller.

A further effect thereof is that the caller may look towards a group of people, and without changing the caller orientation the audio caller communication system may activate a call to at least one or more callee within the group of people. Thereby, the area of view improves even further the possibility of the caller to find and activate a call to at least one callee.

In one or more embodiments the method of initiating a call signal or connecting an audio caller communications system with an audio callee communications system, the method may comprise activating a call signal or establishing a connection via the shared connection server to the at least audio callee communication system when the current callee position of the at least one audio callee communication system is crossed by a sweep of a line of sight in the direction of the caller orientation.

An effect thereof is that the caller may activate plurality of calls to plurality of callees by sweeping the line of sight in the direction of caller orientation. The advantage of sweeping the line of sight is that the area being swept for possible callees may be increased even further, and thereby, the possibility of the caller to activate a call signal to a callee may be further improved.

Alternatively, the speed of the sweeping may indicate to the callee the importance of the call from the caller, and thereby, the callee may be further encouraged to accept the call from the caller.

Alternatively, high speed of the sweeping may indicate to the callee that the call from the caller is of high importance, e.g. the caller may need help or assistance.

Alternatively, low speed of the sweeping may indicate to the callee that the call from the caller is relevant, e.g. the caller may only want to chat with the callee.

In one or more embodiments the method of initiating a call signal or connecting an audio caller communications system with an audio callee communications system, the method may comprise activating a call signal or establishing a connection via the shared connection server to the at least audio callee communication system when a current callee position of the at least one audio callee communication system is tracked for a period of time by the audio caller communications system.

An effect thereof is that the shared connection server may establish a communication between a caller and a callee when tracking the caller's and the callee's position and/or movement.

Alternatively, the shared connection server may predict that the caller wants to communicate with the callee by tracking the position and the movement of the caller and the callee, and thereby, the shared connection may establish a communication between the caller and the callee.

The advantage of the shared connection server may be that the shared connection server may predict/foresee that the caller and the callee are going toward the same destination, and thereby, the shared connection server may establish a communication between the caller and the callee.

In one or more embodiments the method of transferring data from an audio caller communications system to an audio callee communications system, wherein the method comprising transferring data between a caller and a callee via data communication channel when a connection is made between an audio caller communication system and an audio callee communication system.

An effect thereof is to provide the audio caller communication system the ability to transfer/communicate non-oral data or information, where information can be records of data, documents, images, movies, audio and other type of files. The advantage of this is that the user of the audio caller communication system has the possibility of sharing at least a picture file, a document file, and a text message file with a callee.

BRIEF DESCRIPTION OF DRAWINGS

Embodiments of the invention will be described in the figures, whereon:

FIGS. 4A-4D illustrate an exemplary of an audio unit comprising a portable network device and/or a wearable hearing device, FIGS. 5A-5C illustrate an exemplary audio caller communication system activating a call signal via a shared connection server to at least one audio callee communication system by a line of sight in the direction of caller orientation configured to the audio caller communication system, FIG. 6A-6C illustrate an exemplary audio caller communication system activating a call signal via a shared connection server to at least one audio callee communication system by sweeping a line of sight in the direction of the caller orientation configured to the audio caller communication system.

DETAILED DESCRIPTION

| Item | No |
|---|---|
| Audio caller communication system | 1S |
| Another caller communication system | 1SX |
| Audio callee communication system | 1R |
| First audio callee communication system | 1RA |
| Second audio callee communication system | 1RB |
| Third audio callee communication system | 1RC |
| Fourth audio callee communication system | 1RD |
| Fifth audio callee communication system | 1RE |
| Sixth audio callee communication system | 1RF |
| Another audio callee communication system | 1RX |
| User | 2 |
| Another user | 2X |
| First user | 2A |
| Second user | 2B |
| Communicate | 4 |
| Call signal | 4X |
| Another call signal | 4Z |
| Communications channel | 5 |
| Data communication channel | 5X |
| Open communication channel | 6 |
| Close communication channel | 7 |
| Audio unit | 8 |
| Second audio unit | 8B |
| Third audio unit | 8C |
| Area of view | 9 |
| Voice sound | 10 |
| Another voice sound | 10X |
| Microphone | 11 |
| Caller field of view | 12S |
| Caller orientation | 13S |
| Line of sight | 14 |
| Tracking | 15 |
| Approaching | 15X |

-continued

| Item | No |
| --- | --- |
| Public communication network | 17 |
| Orientation unit | 18 |
| Position unit | 19 |
| Sweep | 20 |
| Callee position | 26R |
| Caller position | 26S |
| Shared connection server | 30 |
| Transferring data | 31 |
| Wearable hearing device | 32 |
| Communication group | 33 |
| Function | 34 |
| Portable network device | 35 |
| A person needing medical attention | 36 |
| Caller opening distance | $D_S$ |
| Callee opening distance | $D_R$ |
| Call ID | ID |
| Callee ID | ID0 |
| First callee ID | ID1 |
| Second callee ID | ID2 |
| Third callee ID | ID3 |
| Fourth callee ID | ID4 |
| Another callee ID | IDX |
| Callee profile | CP |
| Caller ID | IDA |
| Another Caller ID | IDZ |

Figure 1:
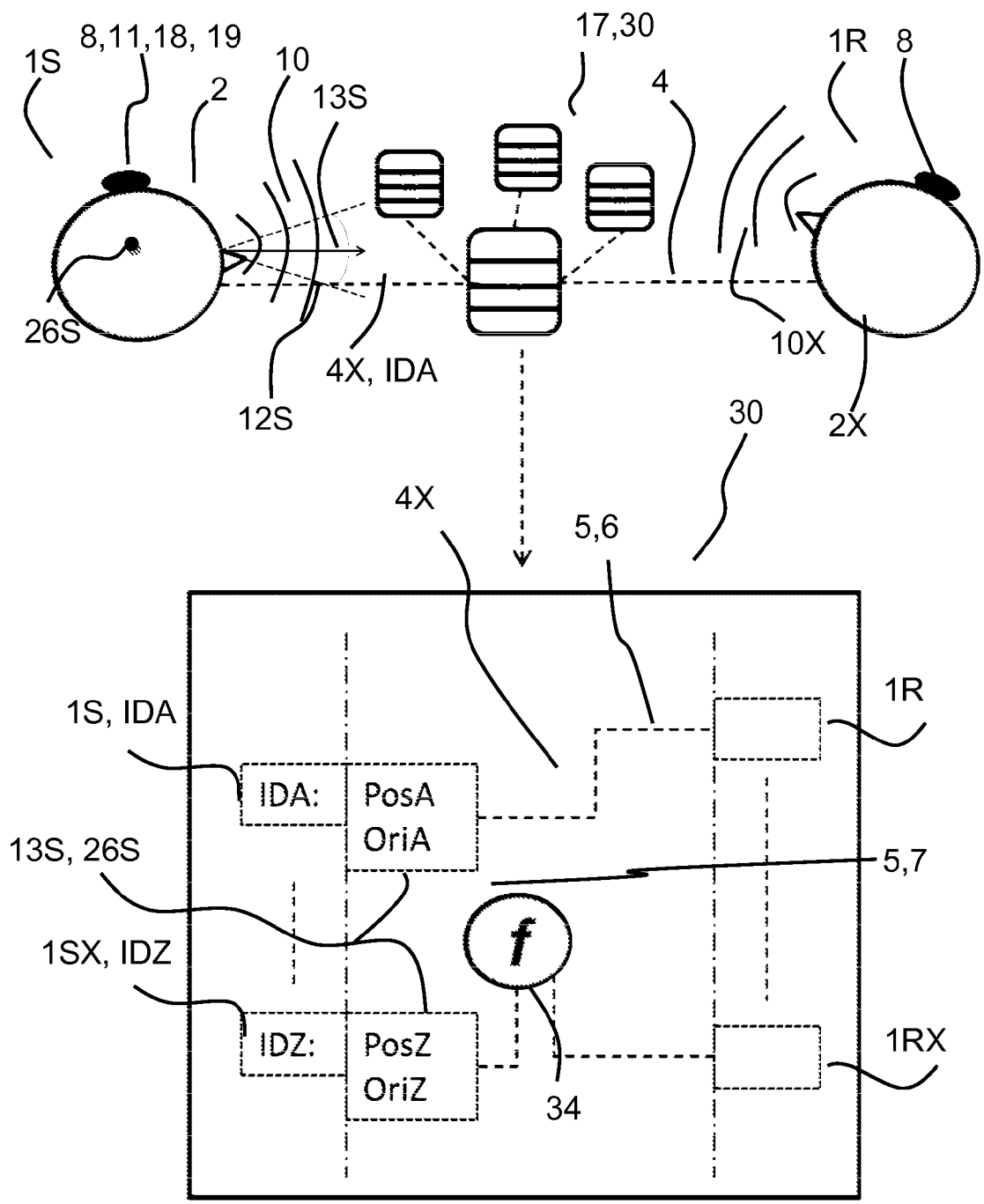
FIG. 1 illustrates an exemplary audio caller communication system communicating via a public communication network and/or a shared connection server to an audio callee communication system.

FIG. 1 illustrates an exemplary audio caller communication system 1S comprising an audio unit 8 configured to sound a voice sound 10X from an audio callee communication system 1R to a user 2 using the system in an intended way The audio unit 8 may comprise a microphone 11 to receive a voice sound 10 from the user 2. Additionally, the audio caller communication system 1S may comprise a position unit 19 configured to estimate a caller position 26S. Additionally, the audio caller communication system 1S may comprise an orientation unit 18 configured for estimating a current caller orientation 13S of the audio caller communication system 1S. Furthermore, the orientation unit 18 may be configured for estimating a caller field of view 12S in the caller orientation 13S of the audio caller communication system 1S.

The audio caller communication system 1S may be configured with a caller ID IDA, which ID is a public network ID like a telephone number, an Internet ID or any other communications network ID in a public communication network 17.

The audio callee communication system 1R will be described in FIG. 2 to which a reference is hereby made. Likewise, specifics of a shared connection server 30 are described in FIGS. 2 and 3.

The audio caller communication system 1S and the audio callee communication system 1R are configured to be able connect so that a user 2 being a caller can call, connect, and communicate with a user 2X of an audio callee communications system 1R through a public communications network 17.

The audio caller communications system 1S may be configured to make a caller position 26S available to a shared connection server 30. This may be in such a way that the caller ID IDA of the caller 1S is linked to the caller position 26S. The audio caller communications system 1S may be configured to make a caller orientation 13S available to a shared connection server 30. This may be in such a way that the IDA of the caller 1S is linked to the caller orientation 13S.

The availability of a caller ID say IDA may be present without disclosing the call ID (IDA) to a callee 18. As such the call is an anonymous call.

In this case, the audio caller communication system 1S is enabled via a shared connection server 30 for a call signal 4X to at least an audio callee communication system 1R.

In this particular example, the audio callee communication system 1R is configured for communicating 4 with the audio caller communication system 1S via the public communication network 17 and/or the shared connection server 30.

The audio caller communication system 1S may be configured so that the caller ID IDA is made available as the call signal 4X to an audio callee communication system 1R as a function 34 of the current caller position 26S and/or the at least one caller orientation 13S estimated by the audio caller communication system 1S. When a call is accepted, an open communication channel (5, 6) is made between the caller 1S with a caller ID IDA or IDS and a callee 1R with a callee ID. In a particular example, the caller ID IDA or IDS may not be made available to the audio callee communication system 1R.

Furthermore, the communication channel 5 between the audio caller communication system 1S and another callee communication system 1RX may be closed 7. However, the caller communication system 1S may still be available for a connection as a function 34 of the current caller position 26S and/or the at least one caller orientation 13S.

Additionally, the shared connection server 30 may be configured to handle connections between more than one other audio caller communication system 1SX and more than one other audio callee communication system 1RX. Likewise, the audio caller communication system 1S may be configured to handle more connections to audio callee communication systems 1R.

Alternatively, the current caller position 26S and/or the current caller orientation 13S linked to the caller ID (IDA) of the audio caller communication system 1S are made publically available via the shared connection server 30 for a call signal 4X to the at least one audio callee communication system 1R.

Alternatively, the audio caller communications system 1S may be configured for transferring data 31 via data communication channel 5X when a connection is made available via an available caller ID IDA.

Figure 2:
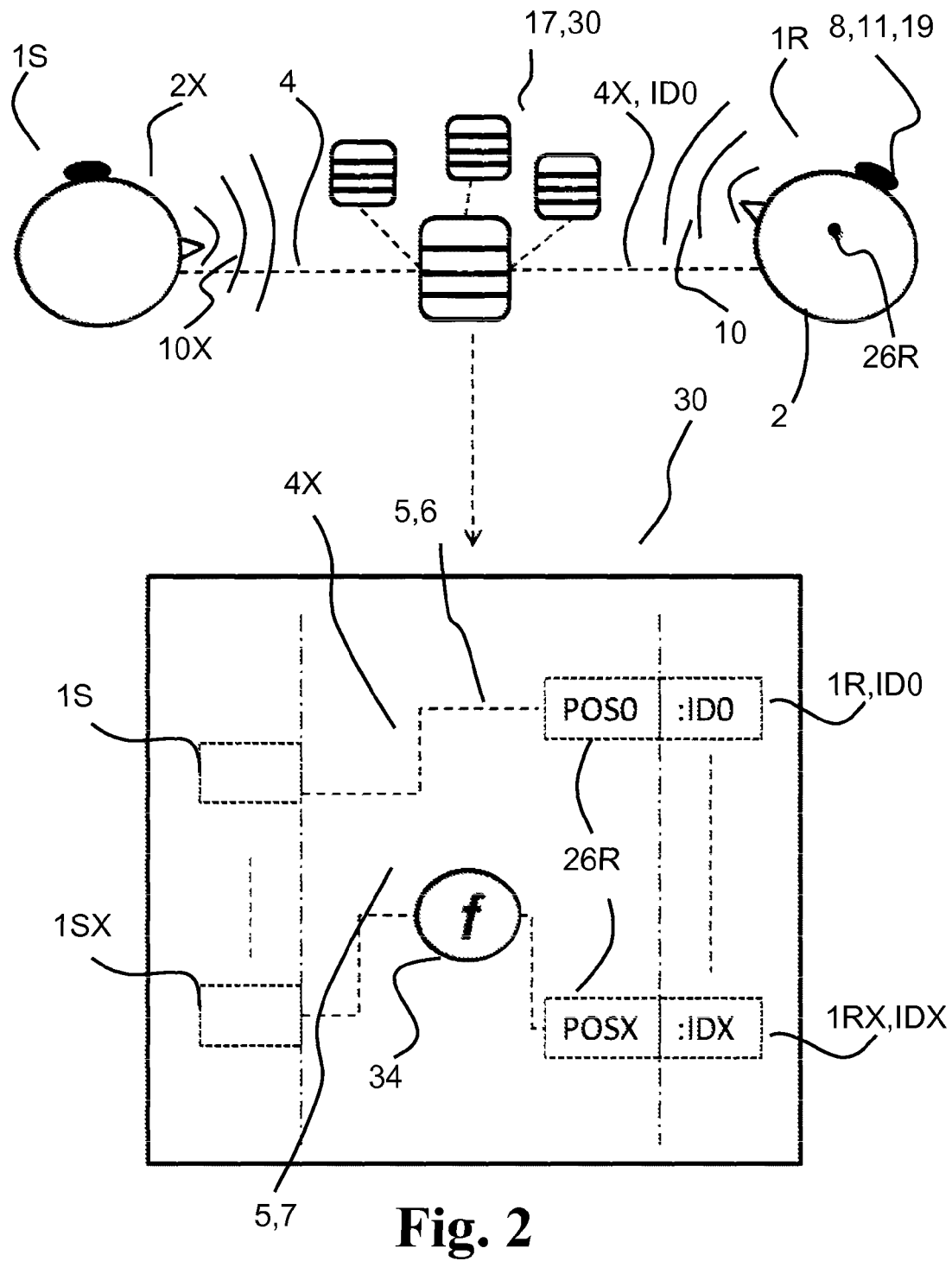
FIG. 2 illustrates an exemplary audio callee communication system communicating via a public communication network and/or a shared connection server to an audio caller communication system.

FIG. 2 illustrates, in continuation of FIG. 1, an exemplary audio callee communication system 1R comprising an audio unit 8 configured to sound a voice sound 10X from an audio caller communication system 1S to a user 2 using the audio callee communication system 1R in an intended way. The audio unit 8 may comprise a microphone 11 receiving a voice sound 10 from the user 2. Additionally, the audio callee communication system 1R may comprise a position unit 19 rendering a callee position 26R.

The audio callee communication system 1R may be configured with at least one call identification (ID), which identification ID is a public network ID like a telephone number, an Internet ID or any other communications network ID in a public communication network 17.

The audio callee communication system 1R may be configured to communicate 4 with a shared connection server 30 about the current position 26R and the callee ID ID0 of the audio callee communication system 1R.

The audio callee communication system 1R may be configured so that the callee ID ID0 is made available via a shared connection server 30 for a call signal 4X from the at least one audio caller communication system 1S for a connection through the communications channel 5 as a function 34 of at least the current callee position 26R.

In this particular example, the audio caller communication system 1S communicates with the audio callee communication system 1R via the public communication network 17 and/or the shared connection server 30 and the audio callee communication system 1R accepts a call signal 4X from the audio caller communication system 1S via the shared connection server 30. When the call signal 4X is accepted, an open communication channel (5, 6) is made between the caller 1S with a caller ID IDA or IDS and a callee 1R with a callee ID ID0. In a particular example, the caller ID IDA or IDS may not be made available to the audio callee communication system 1R.

Furthermore, the communication channel 5 between the audio caller communication system 1S and another callee communication system 1RX may be closed 7. However, the callee communication system 1S may still be available for a connection as a function 34 of the current callee position 26R.

Additionally, the shared connection server 30 may be configured to handle connections between more than one other audio caller communication system 1SX and more than one other audio callee communication system 1RX. Likewise, the audio callee communication system 1R may be configured to handle more connections to audio caller communication systems 1S.

Alternatively, the current callee position 26R linked to the call ID (IDR) of the audio callee communication system 1R may be made publically available via the shared connection server 30 for the call signal 4X by at least one audio caller communication system 1S.

Additionally, the audio callee communication system 1R may be configured as an audio caller communication system (1S) and vice versa.

Figure 3:
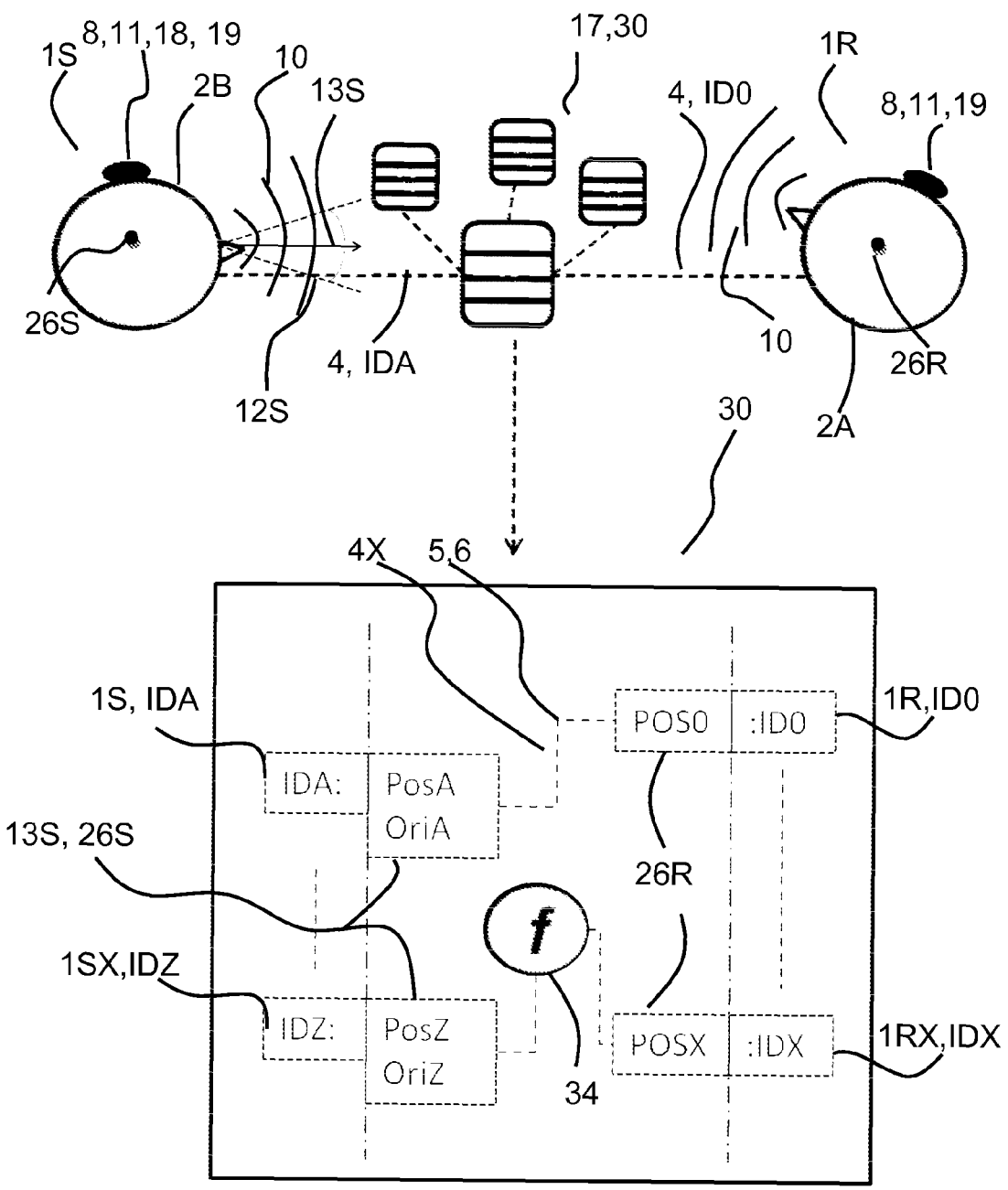
FIG. 3 illustrates an exemplary shared connection server configured to communicate with at least the audio caller communication system and at least the audio callee communication system.

FIG. 3 illustrates an exemplary shared connection server 30 configured to communicate and interact with at least the audio caller communication system 1S, see FIG. 1, and at least the audio callee communication system 1R, see FIG. 2.

The shared connection server 30 may be configured to connect to at least the audio caller communication system 1S with at least the audio callee communication system 1R through a communication channel 5. The connection or the establishment of a open communication channel 5 may be as a function 34 of at least one callee position 26R and at least one caller position 26S and/or at least one caller orientation 13S.

In this particular example, the audio caller communication system 1S is configured to connect to the audio callee communication system 1R by communicating 4 via public network 17 through a communication channel 5 established by the shared connection server 30. The audio caller communication system 1S has made a caller ID IDA available via the shared connection server 30 for a call signal 4X to the at least one callee ID ID0 configured to the audio callee communication system 1R.

The connection between the at least audio caller communication system 1S and the at least audio callee communication system 1R is established through the communication channel 5 as a function of at least one callee position 26R and/or at least one caller position 26S and at least one caller orientation 13S.

The connection may be made in such a way that the call ID (ID0) of the callee is not disclosed to the audio caller communication system 1S. The connection may be made in such a way that the call ID (IDA) of the caller is not disclosed to the audio callee communication system 1R. As such, the connection is made anonymously. Thus, the connection merely discloses the position of the callee and/or the caller to the respective counterpart.

Alternatively, the function 34 may estimate a current caller position based on the caller position 26S and the caller orientation 13S. Additionally, the function 34 compares the estimated caller position and the callee position 26R. If the estimated caller position is the same as the callee position 26R an open communication channel (5,6) is established, or if the estimated caller position is the within a range of the callee position 26R an open communication channel (5,6) is established.

Alternatively, the public communication network 17 and the shared connection server 30 may be separated or combined. In an embodiment, the shared connection server 30 is established or configured in a public communication network 17. In an alternative embodiment, the shared connection server 30 stands alone in the communication network.

FIGS. 4A-D illustrate an exemplary of an audio unit 8 comprising a portable network device 35 and/or a wearable hearing device 32.

FIG. 4A illustrates an audio unit 8 comprising a portable network device 35 connected to a wearable headband hearing device 32. In this particular example, the portable network device comprises a microphone, a position unit 19 and an orientation unit 18. The wearable headband may sound at least a voice sound 10 to the user 2 wearing the wearable headband in an intended way.

FIG. 4B illustrates an audio unit 8 comprising a portable network device 35 connected to a wearable headband hearing device 32. The portable network device 35 and/or the hearing device may comprise a microphone 11, an orientation unit 18 and a position unit 19.

Alternatively, the portable network device 35 may not comprise a microphone 11, an orientation unit 18 and a position unit 19.

FIG. 4C illustrates an audio unit 8 comprising a portable network device 35 connected to a wearable neckband hearing device 32.

FIG. 4D illustrates an audio unit 8 comprising a portable network device 35 connected to a wearable hearing device 32.

The portable network device 35 may be a smart phone, a mobile phone, an iPad, or any kind of a network communication device.

FIGS. 5A-C illustrate an exemplary audio caller communication system 1S activating a call signal 4X and when the call signal 4X is accepted by the audio callee communication system 1R an open communication channel (5,6) is established between the caller 1S and the callee 1R via a shared connection server 30.

FIG. 5A illustrates an audio caller communication system 1S configured with at least one caller ID IDA activating the call signal 4X when the current callee position 26R of the at least one audio callee communication system 1R is a first encounter along a line of sight 14 in the direction of the caller orientation 13S.

In this particular example, the line of sight 14 of the audio caller communication system 1S encounters firstly the current callee position 26R of the audio callee communication system 1R and activating the call signal 4X. The call signal 4X is accepted by the callee 1R and an open communication channel (5, 6) is established between the caller 1S and the callee 1R via a shared connection server 30.

Alternatively, the communication channel 5 may be open 6 or closed 7 when a call signal 4X is activated or deactivated, respectively.

Alternatively, the caller ID (IDA) may be made publically available via the shared connection server 30 for the call signal 4X to the at least one audio callee communication system 1R without disclosing the caller ID (IDA) of the audio caller communication system 1S to the at least one audio callee communication system 1R.

Alternatively, the callee ID (ID0) may be made publically available via the shared connection server 30 for the call signal 4X by at least one audio caller communication system 1S without disclosing the callee ID (ID0) of the audio callee communication system (1R) to the at least one audio caller communication system 1S.

Alternatively, when a communication channel is established via the shared connection server 30 the audio caller communications system 1S may be configured for transferring data 31 via data communication channel 5X when a connection is made available via an anonymously available caller ID IDA. The data communication channel 5X may be combined with the communication channel 5.

In another embodiment, the communication channel 5 may be closed 7 when an audio caller communication system 1S or an audio callee communication system 1R deactivates or declines the call signal 4X.

FIG. 5B illustrates at least two audio caller communication systems (1S, 1SX), each activating a call signal 4X via the shared connection server 30 to at least one audio callee communication system 1R through the communication channel 5 which is open 6 when the callee accepts the call 4X.

Alternatively, the at least two audio caller communication systems (1S, 1SX) establish a communication group 33 with at least one audio callee communication system 1R.

The audio caller communication system 1S is configured with at least one caller ID IDA and another audio caller communication system 1SX is configured with at least one another caller ID IDZ. The at least one audio callee communication system 1R is configured with at least one first anonymous callee ID ID1. The at least one audio callee communication system 1R may receive a plurality of call signals 4X from a plurality of audio caller communication systems (1S, 1SX). The at least one audio callee communication system 1R may accept a plurality of calls 4X establishing an open communication channel (5,6) between a plurality of audio caller communication systems (1S, 1SX) and the audio callee communication system 1R via the shared connection server 30.

In this particular example, the call signals 4X from the two callers (1S, 1SX) are activated when the two lines of sight 14 of the two audio caller communication systems (1S,1SX) encounter first the current callee position 26R of the audio callee communication system 1R. The audio callee communication system 1R accepts the call signals 4X from both callers (1S, 1SX) establishing an open communication channel (5,6) between the plurality of audio caller communication systems (1S, 1SX) and the audio callee communication system 1R via the shared connection server 30.

FIG. 5C illustrates at least one audio caller communication system 1S configured to activate a plurality of call signals 4X to a plurality of audio callee communication systems (1R, 1RX) via the shared connection server 30.

The at least one audio caller communication system 1S may be configured to communicate with more than one audio callee communication systems (1R) via the shared connection server 30.

In this particular example, the line of sight 14 of the audio caller communication system 1S is oriented towards the audio callee communication system which then encounters first the current callee position 26R of the audio callee communication system 1R. A call signal 4X is activated via the shared connection server 30. The callee 1R accepts the call signal 4X and an open communication channel (5,6) is established between the caller 1S and the callee 1R.

Furthermore, the audio caller communication system 1S changes the orientation of the line of sight 14 to another audio callee communication system 1RX so that the line of sight 14 encounters first the current callee position 26R of another audio callee communication system 1RX. Another call signal 4Z is activated via the shared connection server 30. Another callee 1RX accepts another call signal 4Z and an open communication channel (5,6) is established between the caller 1S and another callee 1R.

Thereby, the audio caller communication system 1S has established a communication group 33 comprising at least two audio callee communication systems (1R, 1RX) and the audio caller communication system 1S.

Alternatively, caller ID IDA and/or callee ID IDO may be anonymous.

Alternatively, the call signal 4X may be deactivated or closed when the caller 1S activates another call signal 4Z. The call signal 4X may be deactivated or closed when the caller 1S activates another call signal 4Z and another callee 1RX accepts another call signal 4Z.

FIGS. 6A-C illustrate an exemplary audio caller communication system 1S activating a call signal 4X and when the call signal 4X is accepted by the audio callee communication system 1R an open communication channel (5,6) is established between the caller 1S and the callee 1R via a shared connection server 30.

FIG. 6A illustrates an audio caller communication system 1S configured with at least one caller ID IDA. At least a first, a second and a third audio callee communication system (1RA, 1RB, 1RC) are configured to at least a first, a second and a third callee ID (ID1, ID2, ID3), respectively.

The audio caller communication system 1S may activate a call signal 4X via the shared connection server 30 to the at least one first audio callee communication system 1RA when a current callee position 26R of the at least first audio callee communication system 1RA is crossed by a sweep 20 of a line of sight 14 in the direction of the caller orientation 13S.

In this particular example, the audio caller communication system 1S sweeps 20 the line of sight 14 crossing the current callee position 26R of the at least first and second audio callee communication system (1RA, 1RB) activating a call signal 4X to the first and second audio callee communication system (1RA, 1RB). The two callees (1RA, 1RB) accept the call signal 4X from the caller 1S, and between each of the callees (1RA, 1RB) and the caller 1S an open communication channel (5, 6) is established via the shared connection server 30.

Alternatively, if the two callees (1RA, 1RB) accept the call signal 4X from the caller 1S, and between the callees (1RA, 1RB) and the caller 1S a common open communication channel (5, 6) is established via the shared connection server 30.

Alternatively, the audio caller communication system 1S and the audio callee communication system 1R may be configured with a profile. The profile may be administrated by the user 2 of the caller 1S or the callee 1R.

Alternatively, the speed of a sweep 20 may control a mode of an audio caller communication system 1S. A fast sweep may change the status of the caller 1S into an emergency mode, wherein the emergency mode may activate a plurality of call signals 4X from the caller 1S to a plurality of callees 1R having a profile of a doctor. Furthermore, a normal sweep may change the status of the caller 1S into a custom mode, wherein the custom mode may activate a call signal 4X from the caller 1S to at least one callee 1R.

FIG. 6B illustrates that the audio caller communication system 1S has increased the range of the sweep 20 of the line of sight 14, compared to FIG. 5. The sweep crosses the current callee position 26R of at least the three audio callee communication systems (1EA, 1RB, 1RC) activating at least three call signals. All three callees (1EA, 1RB, 1RC) accept the call signals 4X and at least three communication channels are established between the caller 1S and the three callees (1EA, 1RB, 1RC) via the shared connection server 30.

FIG. 6C illustrates an audio caller communication system activating a call signal to a plurality of callees (1RB, 1RC) by sweeping 20 the line of sight 14 crossing the callee position of each callees (1RB, 1RC).

Another audio caller communication system activates a call signal to the same plurality of callees (1RB, 1RC) by sweeping 20 the line of sight 14 crossing the callee position of each of the callees (1RB, 1RC).

Alternatively, each callees (1RB, 1RC) accepts the call signals 4X from each callers (1S, 1SX) and a communication channel (5,6) is established between each of the callees (1RB, 1RC) and each callers (1S, 1SX).

Alternatively, each of the callees (1RB, 1RC) accepts the call signals 4X from each callers (1S, 1SX) and a common communication channel (5,6) is established between the callees (1RB, 1RC) and the callers (1S, 1SX).

Alternatively, each of the callees (1RB, 1RC) accepts the call signals 4X from each callers (1S, 1SX) and a communication channel (5,6) is established between the callees (1RB, 1RC) and each of the callers (1S, 1SX).

FIGS. 6A-C illustrate an exemplary audio caller communication system 1S activating a call signal 4X and when the call signal 4X is accepted by the audio callee communication system 1R an open communication channel (5,6) is established between the caller 1S and the callee 1R via a shared connection server 30.

Figure 7A:
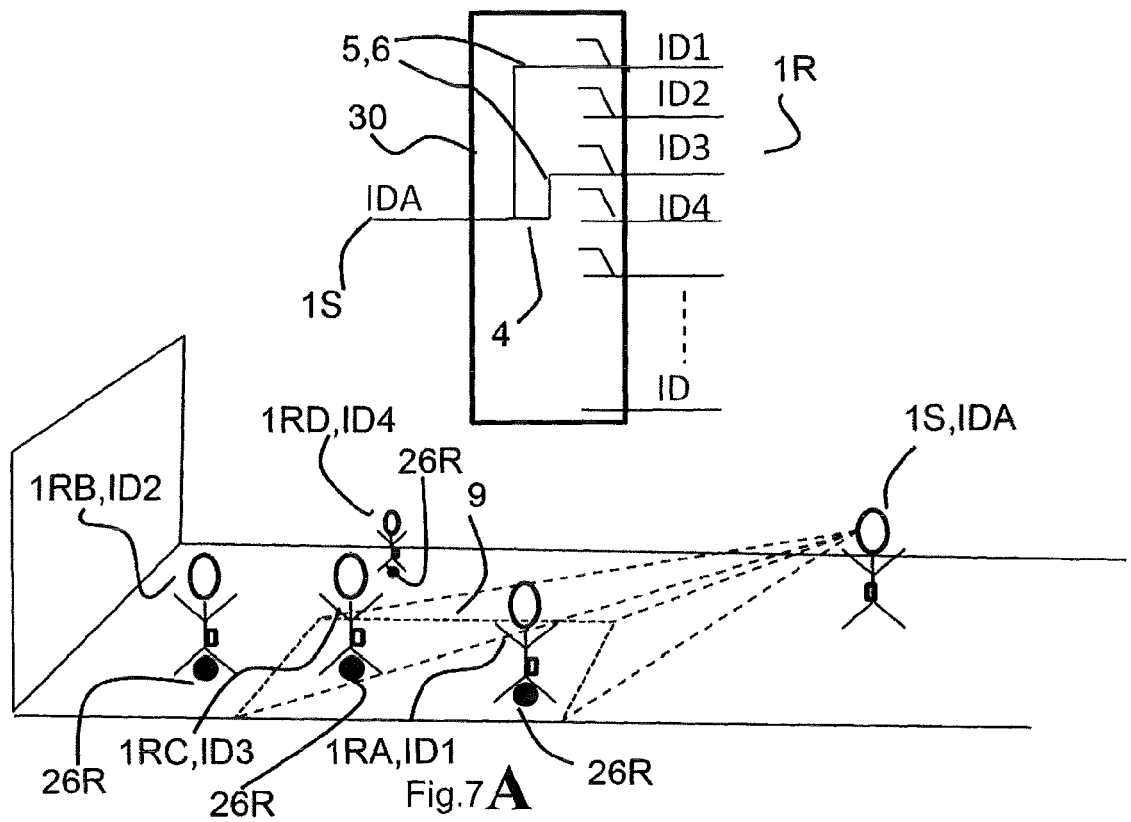
FIG. 7A-7B illustrate an exemplary audio caller communication system activating a call signal via a shared connection server to at least one audio callee communication system by the area of view at a certain distance in the direction of the caller orientation configured to the audio.
Figure 7B:
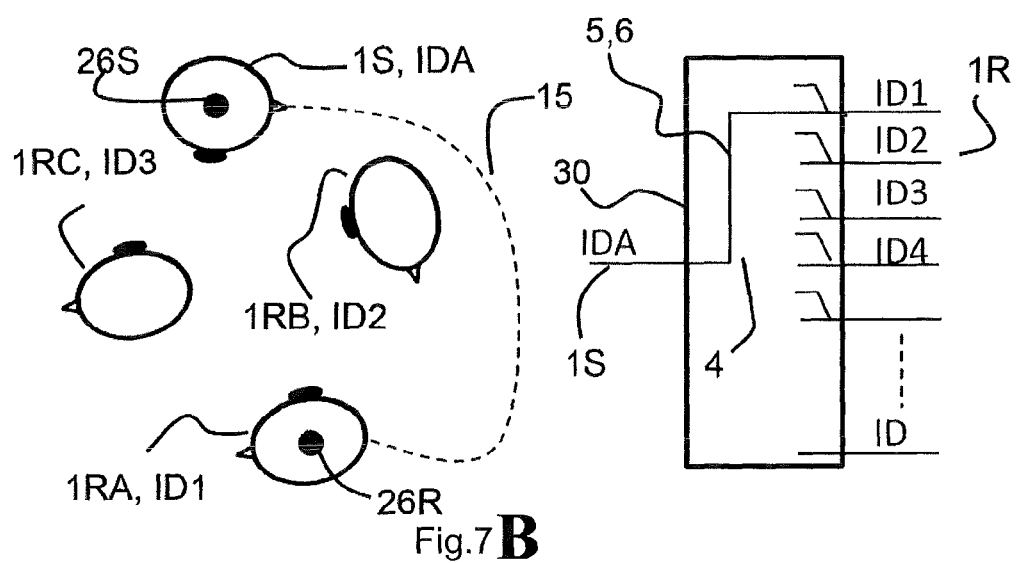

FIGS. 7A-B illustrate an exemplary audio caller communication system 1S activating a call signal 4X and when the call signal 4X is accepted by the callee 1R an open communication channel (5,6) is established between the caller 1S and the callee 1R via a shared connection server 30.

FIG. 7A illustrates the audio caller communication system 1S configured with at least one caller ID IDA. At least a first, a second, a third and a fourth audio callee communication system (1RA, 1RB, 1RC, 1RD) are configured with at least a first, a second, a third and a fourth callee ID (ID1, ID2, ID3, ID4), respectively. The audio caller communication system 1S may activate the call signal 4X via the shared connection server 30 to the at least audio callee communication system 1R when the current callee position 26R of the at least one audio callee communication system 1R is within an area of view 9 at a certain distance in the direction of the caller orientation (13S).

In this particular example, the area of view 9 of the audio caller communication system 1S encloses the current callee position 26R of the at least one, first and second audio callee communication system (1RA, 1RB). Thereby, the audio caller communication system 1S activates a call signal 4X to the first and the second audio callee communication systems (1RA, 1RB) via the shared connection server 30. The callees (1RA, 1RB) accept the call signal 4X and the open communication channel (5,6) is established.

FIG. 7B illustrates the audio caller communication system 1S activating the call signal 4X via the shared connection server 30 to the at least audio callee communication system 1R when a current callee position 26R of the at least one audio callee communication system 1R is tracking 15 for a period of time by the audio caller communications system 1S configured to a current caller position 26S.

In this particular example, the audio caller communication system 1S is moving among a plurality of callees (1RA-1RC). The caller 1S is tracking 15 behind a first callee 1RA for a period of time wanting to establish a communication to the first callee 1RA. After the period of time the call signal 4X is activated and an open communication channel (5, 6) is established between the caller 1S and the first callee 1RA.

Figure 8A:
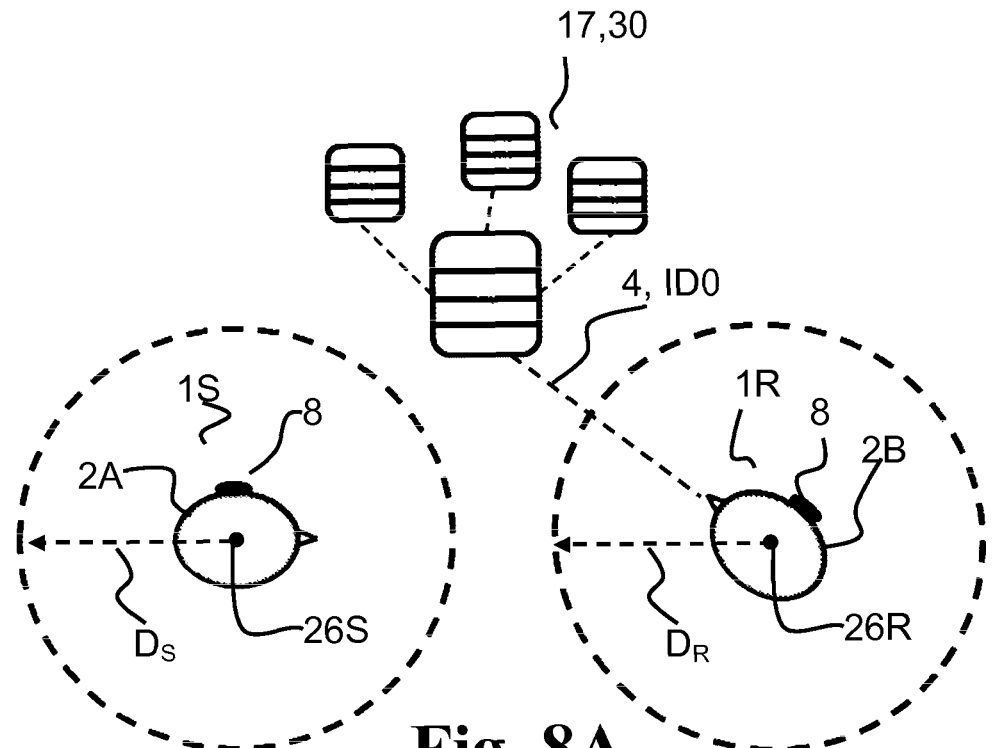
FIGS. 8A-8B illustrate an exemplary audio caller communication system activating a call signal via a shared connection server to at least one audio callee communication system by overlapping a caller and a callee opening distance.
Figure 8B:
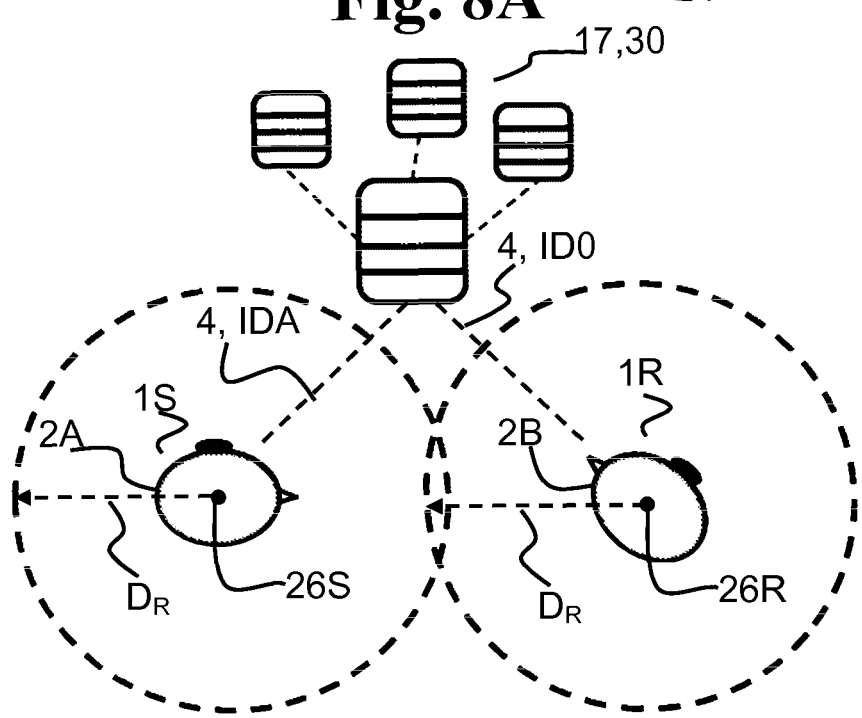

FIGS. 8A-B illustrate an exemplary audio caller communication system 1S activating a call signal 4X via a shared connection server 30 to at least one audio callee communication system 1R through a communication channel 5 which is open 6. The audio caller communication system 1S is configured to at least one caller ID IDA and the at least one audio callee communication system 1R is configured to at least one callee ID ID0.

The audio caller communication system 1S is configured to a caller opening distance $D_S$ and the audio callee communication system 1R is configured to a callee opening distance $D_R$.

FIG. 8A illustrates that the caller and the callee opening distance ($D_R$, $D_S$) are not overlapping, and thereby, no call signal 4X is activated. The audio callee communication system 1R has activated the callee ID ID0 via the shared connection server 30.

FIG. 8B illustrates the caller and the callee opening distance ($D_R$, $D_S$) overlapping, and thereby, a call signal 4X is activated via the shared connection server 30 from the audio caller communication system 1S to the audio callee communication system 1R.

Figure 9A:
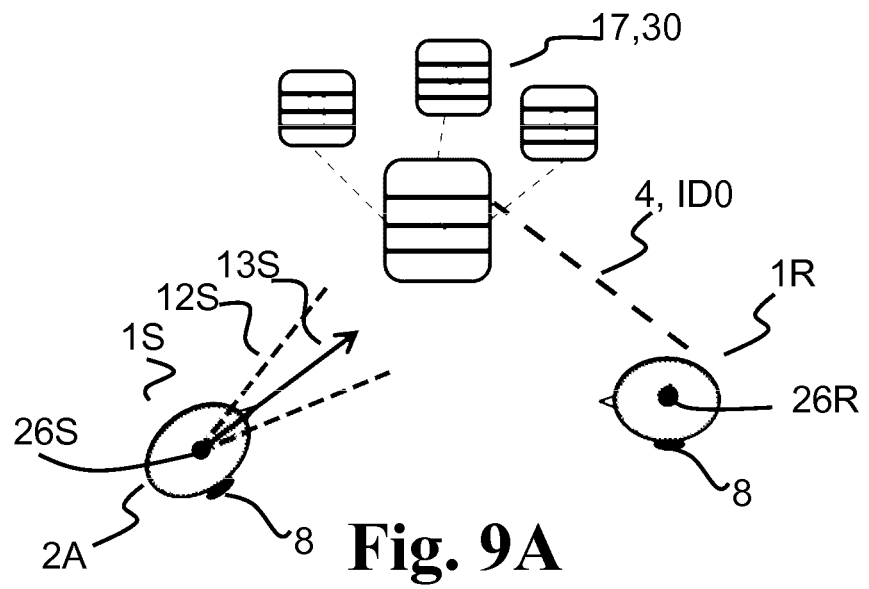
FIGS. 9A-9B illustrate an exemplary audio caller communication system activating a call signal via a shared connection server to at least one audio callee communication system by the field of view configured to the audio caller communication system.
Figure 9B:
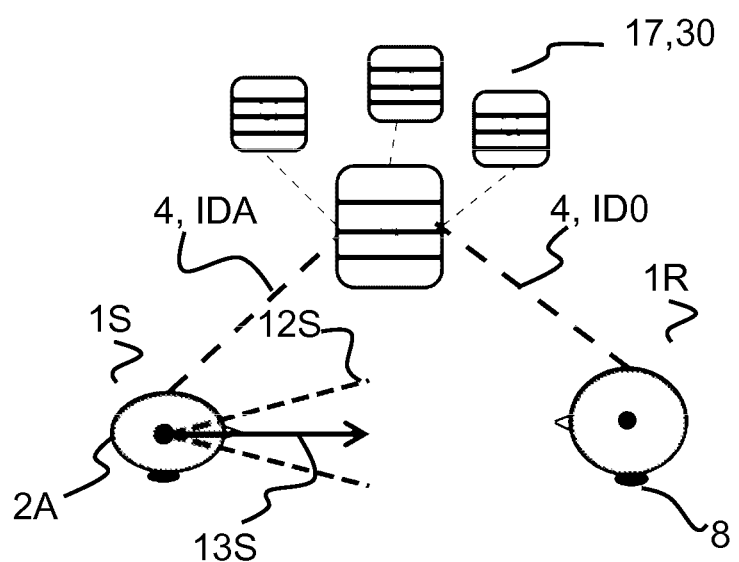

FIGS. 9A-B illustrate an exemplary audio caller communication system 1S activating a call signal 4X via a shared connection server 30 to at least one audio callee communication system 1R through a communication channel 5 which is open 6. The audio caller communication system 1S is configured to at least one anonymous caller ID IDA and the at least one audio callee communication system 1R is configured to at least one anonymous callee ID ID0.

The audio caller communication system 1S is configured to a caller field of view 12S in the caller orientation 13S.

FIG. 9A illustrates that the audio caller communication system 1S has oriented 13S the field of view 12S away from the audio callee communication system 1R, and thereby, no call signal 4X is activated. The audio callee communication system 1R has activated the callee ID ID0 via the shared connection server 30.

FIG. 9B illustrates the audio caller communication system 1S activating the call signal (4X) via the shared connection server 30 to the at least audio callee communication system 1R when the current callee position 26R of the audio callee communication system 1R is within the caller field of view 12S of the audio caller communication system 1S.

Figure 10:
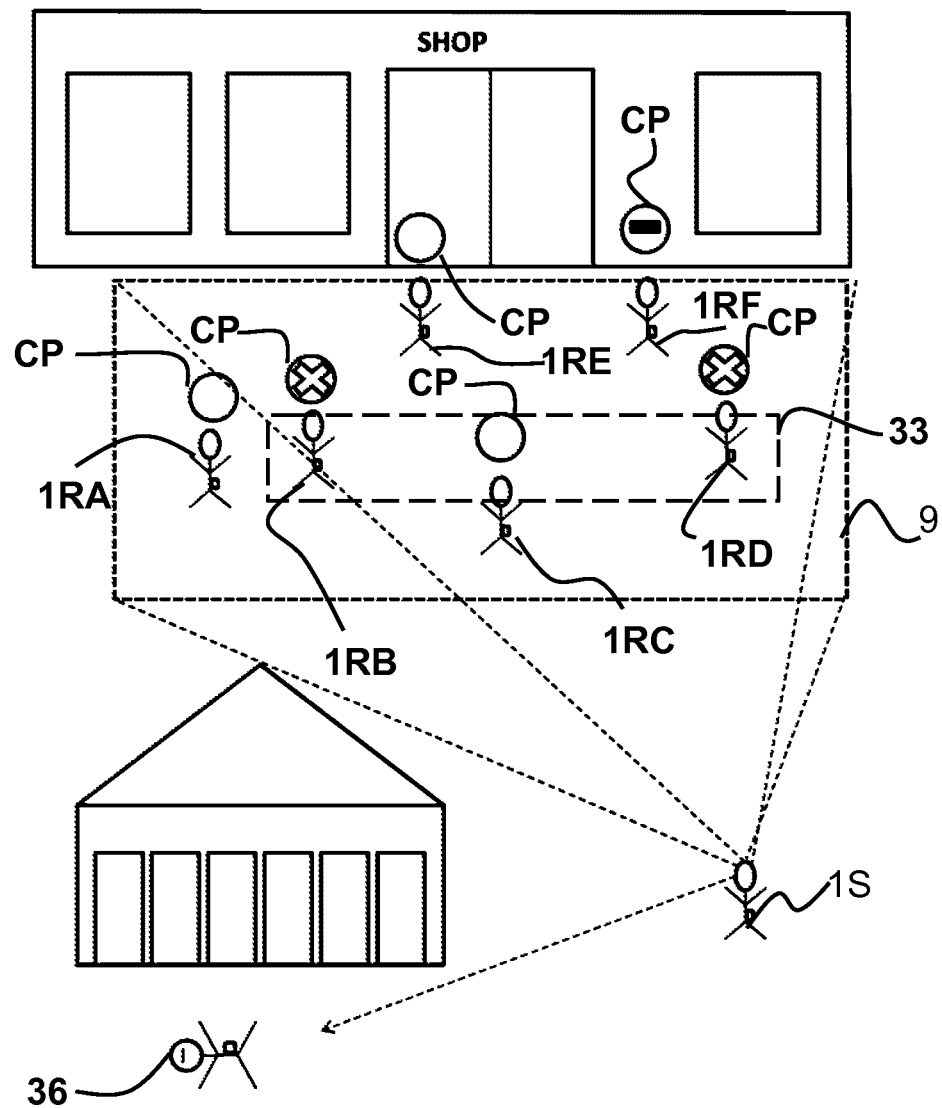
FIG. 10 illustrates a situation where a user configured to an audio caller communication system walking around on a square with other users each configured to an audio callee communication system, and each audio callee communication system is configured to a callee profile CP.

FIG. 10 illustrates a situation where an audio caller communication system 1S is walking around on a square with a plurality of audio callee communication systems (1RA-1RE). Each audio callee communication system is configured to a callee profile CP.

A first, a third and a fifth audio callee communication system (1RA, 1RC, 1RE) has not defined a callee profile CP. A second and a fourth callee communication system (1RB, 1RD) has defined same callee profile CP, which in this particular example is disclosing a profile of a doctor. A sixth audio callee communication system 1RF has defined a callee profile CP, which in this particular example is disclosing a profile of a policeman.

Furthermore, the audio caller communication system 1S is configured to activate the call signal 4X via the shared connection server 30 when the current callee position 26R of the at least one audio callee communication system 1R has the preferred callee profile CP within an area of view 9 at a certain distance in the direction of the caller orientation 13S.

In this particular example, the user 2 configured to the audio caller communication system 1S suddenly sees a person in need of medical attention 36. The user 2 immediately initializes the audio caller communication system 1S activating a call signal 4X to at least one audio callee communication system (1RB, 1RD) having a callee profile CP disclosing a profile of a doctor or a nurse.

The area of view 9 configured to the audio caller communication system 1S is oriented 13S towards a crowd, and immediately a plurality of call signals 4X is activated via the shared connection server 30 to the second and the fourth audio callee communication system (1RB, 1RD). Both callees (1RB, 1RD) have a callee profile of a doctor. A communication group 33 is formed comprising the audio caller communication system 1S and the first and the second audio callee communication system (1RB, 1RD). The user 2 configured to the audio caller communication system 1S communicates with the first and the second audio callee communication system (1RB, 1RD) through the established communication channel (5, 6). The caller 1S guides the two callees (1RB, 1RD) to the person in need of medical attention 36.

Although particular embodiments have been shown and described, it will be understood that they are not intended to limit the claimed inventions, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. An audio caller communication system configured to communicate via a public communications network where each audio caller communications system has at least one call ID for identification and for a connected call with at least one audio callee communication system through a communications channel that can be open or closed, the audio caller communication system comprising;
    at least one audio unit configured to sound a voice sound to a user using the audio caller communication system and from the at least one audio callee communication system;
    at least one microphone configured to receive the voice sound from the user using the audio caller communication system;
    a position unit configured to estimate a current caller position of the audio caller communication system;
    an orientation unit configured for estimating a current caller orientation of the audio caller communication system and a caller field of view in the caller orientation of the audio caller communication system;
which audio caller communication system is configured to communicate with a shared connection server about the current caller position, the caller orientation and the call ID of the audio caller communication system, and to
make the at least one call ID available as a caller ID via the shared connection server for a call signal to the at least one audio callee communication system for a connection through the communications channel as a function of at least the current caller position and/or at least the current caller orientation.

2. An audio caller communication system according to claim 1 configured to make the call ID publically available via the shared connection server for a call signal to the at least one audio callee communication system without disclosing the call ID of the audio caller communication system to the at least one audio callee communication system.

3. An audio caller communication system according to claim 1, wherein the current caller position and/or the current caller orientation are linked to the call ID of the audio caller communication system and which caller position and/or caller orientation are made publically available via the shared connection server for a call signal to the at least one audio callee communication system.

4. An audio caller communications system according to claim 1 further configured for establishing a communication group of one or more audio callee communications system via the shared connection server.

5. An audio caller communications system according to claim 1 further configured for transferring data via data communication channel when a connection is made with an audio callee communications system.

6. An audio callee communication system configured to communicate via a public communications network where the audio callee communications system has at least one call ID for identification and for a connected call with at least one audio caller communication system through a communications channel that can be open or closed, the audio callee communication system comprising;
    at least one audio unit configured to sound a voice sound to a user using the audio callee communication system and from the at least one audio caller communication system;
    at least one microphone configured to receive the voice sound from the user using the audio callee communication system;
    a position unit configured to estimate a current callee position of the audio callee communication system;
which audio callee communication system is configured to communicate with a shared connection server about the current position and the call ID of the audio callee communication system, and to
make the at least one call ID available as a callee ID via the shared connection server for a call signal from the at least one audio caller communication system for a connection through the communications channel as a function of at least the current callee position.

7. An audio callee communication system according to claim 6, configured to make the call ID publically available via the shared connection server for a call signal by at least one audio caller communication system without disclosing the call ID of the audio callee communication system to the at least one audio caller communication system.

8. An audio callee communication system according to claim 7, wherein the current callee position is linked to the call ID of the audio callee communication system, which callee position is made publically available via the shared connection server for a call signal from at least one audio caller communication system.

9. An audio callee communication system according to claim 6 configured as an audio caller communication system.

10. A shared connection server configured to communicate with
    at least an audio caller communications system according to claim 6 about at least one call ID as a caller ID and at least the current caller position and/or the caller orientation;
    at least an audio callee communications system about at least one call ID as a callee ID and at least the current callee position; and
which shared connection server is configured to connect at least one audio callee communication system with at least one audio caller communication system through a communications channel as a function of
    at least one callee position and;
    at least one caller position and/or at least one caller orientation.

11. A shared connection server according to claim 10, wherein the caller ID of the at least one audio caller communication system and the callee ID of the at least one audio callee communication system are made publically available via the shared connection server for connecting at least one audio caller communication system with at least one callee communication system without disclosing;
- the callee ID to the at least one audio caller communication system and/or;
- the caller ID to the at least one audio callee communication system.

12. A shared connection server according to claim 10, wherein
- the at least one caller position and the at least one caller orientation of the audio caller communication system and/or
- the at least one callee position of the audio callee communication system are made publically available via the shared connection server for connecting at least one audio caller communication system with at least one callee communication system.

13. A method of initiating a call signal between or connecting an audio caller communications system with an audio callee communications system through a communications channel via a shared connection server, the method comprising;
- initiating a connection between an callee and caller communication system,
- configuring at least one microphone to receive the voice sound from the audio caller communications system to the callee communications system;
- configuring a position unit to estimate a current caller position and orientation of the audio caller communication system;
- configuring the shared connection server to receive information from the positioning unit about the current caller position, caller orientation and caller ID of the audio caller communication system, and
- making at least one call ID available as a caller ID via the shared connection server for a call signal to the at least one audio callee communication system for a connection through a communications channel as a function of at least the current caller position and/or at least the current caller orientation;
- configuring an orientation unit configured for estimating a current caller orientation of the audio caller communication system and a caller field of view in the caller orientation of the audio caller communication system.

14. A method of initiating a call signal between or connecting an audio caller communications system with an audio callee communications system according to claim 13, the method comprising activating a call signal or establishing a connection via the shared connection server to the at least audio callee communication system when the current callee position of the audio callee communication system is within a caller field of view of the audio caller communication system.

15. A method of initiating a call signal or connecting an audio caller communications system with an audio callee communications system according to claim 13, the method comprising activating a call signal or establishing a connection via the shared connection server to the at least audio callee communication system when the audio caller communication system is approaching the audio callee communications system.

16. A method of initiating a call signal or connecting an audio caller communications system with an audio callee communications system-according to claim 13, the method comprising activating a call signal or establishing a connection via the shared connection server to the at least audio callee communication system when the current callee position of the at least one audio callee communication system is a first encounter along a line of sight in the direction of the caller orientation.

17. A method of initiating a call signal or connecting an audio caller communications system with an audio callee communications system according to claim 13, the method comprising activating a call signal or establishing a connection via the shared connection server to the at least audio callee communication system when the current callee position of the at least one audio callee communication system is within an area of view at a certain distance in the direction of the caller orientation.

18. A method of initiating a call signal or connecting an audio caller communications system with an audio callee communications system according to claim 13, the method comprising activating a call signal or establishing a connection via the shared connection server to the at least audio callee communication system when the current callee position of the at least one audio callee communication system-is crossed by a sweep of a line of sight in the direction of the caller orientation.

19. A method of initiating a call signal or connecting an audio caller communications system with an audio callee communications system according to claim 13, the method comprising activating a call signal or establishing a connection via the shared connection server to the at least audio callee communication system when a current callee position of the at least one audio callee communication system is tracked for a period of time by the audio caller communications system.

* * * * *